(12) United States Patent
Ding (10) Patent No.: US 9,948,843 B2
(45) Date of Patent: Apr. 17, 2018

(54) SUPER RESOLUTION BORE IMAGING SYSTEM

(71) Applicant: Mitutoyo Corporation, Kanagawa-ken (JP)

(72) Inventor: Yuhua Ding, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 140 days.

(21) Appl. No.: 15/186,231

(22) Filed: Jun. 17, 2016

(65) Prior Publication Data
US 2017/0366714 A1 Dec. 21, 2017

(51) Int. Cl.
*H04N 5/225* (2006.01)
*G06T 3/40* (2006.01)

(52) U.S. Cl.
CPC ......... *H04N 5/2256* (2013.01); *G06T 3/4053* (2013.01); *H04N 2005/2255* (2013.01)

(58) Field of Classification Search
CPC ................ H04N 5/2256; H04N 5/225; H04N 2005/2255; G06T 3/4053
USPC ........ 348/85, 82; 324/318, 323; 250/227.11, 250/227.2; 340/853.1; 367/25
IPC ..................................................... H04N 5/225
See application file for complete search history.

(56) References Cited

U.S. PATENT DOCUMENTS

| 4,849,626 | A | 7/1989 | Franklin, Jr. |
| 6,791,072 | B1 | 9/2004 | Prabhu |
| 6,849,843 | B2 | 2/2005 | Ansorge et al. |
| 7,636,204 | B1 | 12/2009 | Bourget |
| 7,786,421 | B2 | 8/2010 | Nikzad et al. |
| 8,334,971 | B2 | 12/2012 | Keller et al. |
| 8,372,726 | B2 | 2/2013 | de Graff et al. |
| 8,570,505 | B2 | 10/2013 | Baleine et al. |
| 8,742,325 | B1 | 6/2014 | Droz et al. |
| 2010/0264502 | A1 | 10/2010 | Christophersen et al. |
| 2012/0182631 | A1* | 7/2012 | Le .................. A61B 1/00009 359/822 |
| 2012/0261551 | A1 | 10/2012 | Rogers |
| 2013/0112881 | A1 | 5/2013 | Rudolf |

(Continued)

OTHER PUBLICATIONS

Ben-Ezra et al., "Penrose Pixels: Super-Resolution in the Detector Layout Domain," *Microsoft Research Asia*, Dec. 26, 2007, 8 pages.

(Continued)

*Primary Examiner* — Sherrie Hsia
(74) *Attorney, Agent, or Firm* — Seed IP Law Group LLP (57) ABSTRACT

A super resolution bore imaging system is disclosed for imaging a cylindrical bore. The system includes a controller, a photodetector configuration having a known pixel geometry, and an imaging arrangement that images bore surface segments onto the photodetector. In one embodiment, the controller is configured to acquire respective combinable sets of raw bore segment image data using the pixels of the photodetector configuration positioned, relative to the bore segment, at respective imaging-Z coordinates which are separated along the bore axial direction by a subpixel shift. In some embodiments, the pixel geometry is configured to provide super resolution along the circumferential direction without a change in position along the circumferential direction between acquiring the respective sets of image data. The controller combines the sets of raw image data to form a super resolution image data for the bore segment.

20 Claims, 7 Drawing Sheets

(56) References Cited

U.S. PATENT DOCUMENTS

2016/0176136 A1* 6/2016 Yang .................. B29C 33/02
264/403
2016/0178534 A1 6/2016 Shaffer

OTHER PUBLICATIONS

Farsiu et al., "Fast and Robust Multiframe Super Resolution," *IEEE Transactions on Image Processing* 13(10):1327-1344, Oct. 2004, 18 pages.
Kamal et al., "Super-resolution: A Comprehensive Survey," *Aalborg University*, 2014, 52 pages.
Kevin Su, "Introduction to Image Super-resolution," 46 pages.
Park et al., "Super-Resolution Image Reconstructions: A Technical Overview," IEEE Signal Processing Magazine, May 2003, 16 pages.

* cited by examiner

(a) pixel pattern

(b) Object plane – "normal" scan mode

(c) Object plane – super res. scan mode

(a) pixel pattern (b) Object plane – "normal" scan mode (c) Object plane – super res. scan mode

SUPER RESOLUTION BORE IMAGING SYSTEM

BACKGROUND

Technical Field

The present application relates generally to bore inspection systems and more particularly to bore imaging systems having multi-frame super resolution imaging capability.

Description of the Related Art

Various bore imaging systems are known that use a bore surface imaging arrangement for imaging the interior of a bore, for example in a cylinder bore of an engine. Exemplary bore inspection systems are disclosed in U.S. Pat. Nos. 4,849,626; 7,636,204; 8,334,971; 8,570,505; U.S. Patent Publication No. 2013/0112881; and U.S. patent application Ser. No. 14/581,926, filed Dec. 23, 2014, each of which is hereby incorporated herein by reference in its entirety. Such bore imaging systems may be configured to provide a 360 degree view (also referred to as a panoramic view and/or image) of the interior of a bore in order to inspect for form errors or surface defects. These systems may use signal processing to map image pixel signals or detector element signals to coordinates on the interior surface of the bore. Some such systems use high-resolution imaging configurations including photodetector elements having a small pixel size. The small pixel size, however, may produce poor signal to noise ratio, and/or suffer from reduced light collection, which hinders acquisition of high-quality images.

A high-resolution metrology-grade bore imaging system which does not rely solely on small pixel size to achieve high resolution, and which furthermore achieves high bore inspection scanning rates, would be desirable.

BRIEF SUMMARY

A super resolution bore imaging system is disclosed for imaging a bore surface inside an approximately cylindrical bore in high (super) resolution. The bore surface extends along an axial direction and along a circumferential direction transverse to the axial direction. The super resolution bore imaging system includes a photodetector configuration having a known pixel geometry comprising at least a first set of pixels arranged along a direction on the photodetector configuration corresponding to the circumferential direction, at least some of the first set of pixels having a maximum dimension A along a direction on the photodetector configuration corresponding to the axial direction and at least some of the first set of pixels having a maximum dimension C along a direction on the photodetector configuration corresponding to the circumferential direction. The super resolution bore imaging system further includes a bore surface imaging arrangement configured to transmit image light arising from an image zone on the bore surface to the photodetector configuration, and provide an optical magnification (or demagnification) M. The super resolution bore imaging system further includes a controller configured to operate the super resolution bore imaging system to acquire a plurality of sets of image data including a bore surface segment on the bore surface. The plurality of sets of image data comprise a first acquired set of image data including the bore surface segment and at least one additional acquired set of image data including the bore surface segment. The first acquired set of image data includes the bore surface segment acquired using the first set of pixels of the photodetector configuration positioned, relative to the bore surface segment, at a first imaging-Z coordinate Z1 along the axial direction and a first imaging-φ coordinate φ1 along the circumferential direction, the first set of image data having a raw data resolution along the axial and circumferential directions. The at least one additional acquired set of image data includes the bore surface segment acquired using a set of pixels of the photodetector configuration positioned, relative to the bore surface segment, at a respective imaging-Z coordinate Zi and a respective imaging-φ coordinate φi along the circumferential direction, where i is an index integer. Each additional acquired set of image data has a raw data resolution along the axial and circumferential directions. The super resolution bore imaging system is configured such that at least one of the respective imaging coordinates Zi and φi used for at least one of the plurality of sets of image data of the bore surface segment is different than the corresponding imaging coordinate Z1 and φ1, to satisfy at least one of the conditions (a) $Zi=Z1+k(A/M)$ or $Zi=Z1-k(A/M)$, where k is a number less than 1.0, or (b) $φi=φ1+j(C/M)$ or $φi=φ1-j(C/M)$, where j is a number less than 1.0. The format of the expression for condition (b) is chosen to emphasize the principle of providing a subpixel offset of the imaging coordinate. However, it will be understood that C may be converted from a linear pixel dimension (e.g., as expressed in the figures) to an appropriate corresponding number of degrees or radians for dimensional consistency in this expression. Thus, at least one of k or j corresponds to a subpixel shift. The controller is configured to combine the plurality of sets of image data including the bore surface segment, based on the known pixel geometry and the imaging coordinates, to provide a corresponding set of super resolution image data of the bore surface segment having a resolution along at least one of the axial direction or the circumferential direction that is finer than the raw data resolution along the corresponding direction.

As outlined in greater detail below, in various embodiments, axial motion or positioning of the super resolution bore imaging system is used in combination with a photodetector configuration having an advantageous pixel geometry configured to interact with the axial motion in an efficient manner, to provide a plurality of combinable sets of image data, to provide a super resolution (e.g., microscopic) bore inspection image with high throughput.

BRIEF DESCRIPTION OF THE SEVERAL VIEWS OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
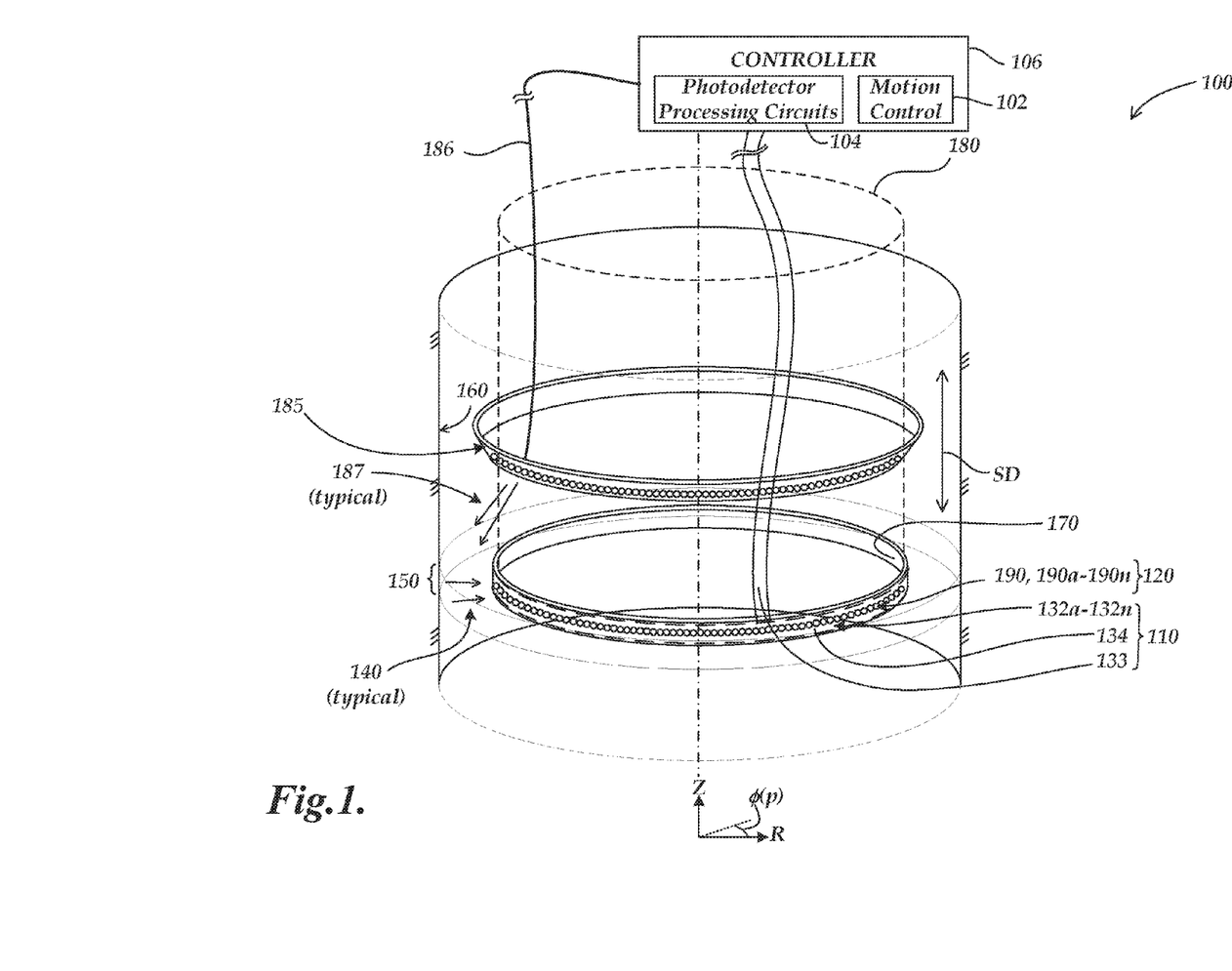
FIG. 1 is a schematic diagram of one embodiment of a bore imaging system suitable for use in achieving super resolution bore imaging according to principles disclosed herein.

FIG. 1 is a schematic diagram of one embodiment of a bore imaging system 100 suitable for use in achieving super resolution bore imaging according to principles disclosed herein. In this embodiment, the bore imaging system 100 comprises a photodetector configuration 110 (also referred to herein simply as a photodetector) and a bore surface imaging arrangement 120, both carried on a curved carrier 170 that holds them in a stable form. The bore imaging system 100 may be carried on a schematically represented housing member 180 which holds everything in the proper relationship and which may be mounted to or include a motion control system or the like (e.g., as controlled by "motion control 102" in FIG. 1) for scanning the bore imaging system 100 along an axial scanning direction SD to image a desired axial section of a bore surface 160. The bore imaging system 100 may further comprise an illumination portion 185, in some embodiments. In various embodiments the illumination portion 185 may comprise a strobe light source, controllable to determine an exposure duration and timing (e.g., a timing which is triggered at a particular imaging position, for example). FIG. 1 is arranged according to cylindrical coordinates Z, R and φ which are aligned with the cylindrical bore, wherein Z corresponds to the axial direction and φ (or "P") corresponds to the circumferential direction on the bore surface 160. The photodetector 110 comprises an array of imaging pixels 132a-132n and a pixel substrate 134. In some embodiments, the pixels 132a-132n and the pixel substrate 134 may be merged and/or indistinguishable (e.g., in the form of a semiconductor photodetector array on a thinned semiconductor substrate). In other embodiments, they may be distinguishable diced semiconductor photodetector elements bonded to a flexible material that also carries interconnections and the like. In any case, the pixels 132a-132n are formed of photodetector elements that provide image data (e.g., intensity values), which may be output individually, or in parallel, or multiplexed, or serialized, or otherwise processed before being output on connections 133. That is, in some embodiments, processing circuits may be provided as part of the photodetector 110 and/or on the carrier 170. In other embodiments, photodetector processing circuits 104 may be provided in a controller 106, which receives image pixel signals from the photodetector 110 via the connections 133.

The bore surface imaging arrangement 120 comprises a lens arrangement 190 that images the bore surface 160 onto the imaging pixels 132a-132n while providing an optical magnification M. In this embodiment, the lens arrangement 190 takes the form of an array of lens elements 190a-190n, as described in greater detail below with reference to FIGS. 2A and 2B. The illumination portion 185 is connected to an illumination power and control element, which may be provided as part of or in connection with the controller 106, via an illumination/control line 186. In operation, the illumination portion 185 is arranged to provide illumination 187 to an image zone 150 on the bore surface 160. In alternative embodiments, an illumination portion may be omitted, or provided on the carrier 170, or in any other convenient form. In any case, the bore surface imaging arrangement 120 is configured to transmit image light 140 arising from the image zone 150 to the photodetector 110, and to the imaging pixels 132a-132n.

In the embodiment shown in FIG. 1, the bore imaging system 100 is moved relative to the bore surface 160 along a scanning direction SD to provide images that cover the bore surface 160 along an axial direction Z. In various embodiments, either the bore imaging system 100 or the bore surface 160 may be stationary, and the other may be moved in a manner measured and controlled by the bore imaging system 100, according to known methods.

In the embodiment shown in FIG. 1, the photodetector 110 is curved in an approximately circular shape on the carrier 170. In some embodiments, the carrier 170 may be a portion of the housing member 180. In various embodiments, the substrate 134 may be a flex print, an elastomer or a thinned semiconductor substrate, or another curvable substrate that provides the required properties for providing a curved imaging array. In some embodiments, the curved photodetector 110 may be formed of a flexible IC sensor such as a FleX™ Silicon-on-Polymer™ CMOS sensor available from American Semiconductor of Boise, Id., or a curved high-resolution CCD sensor provided by Andanta of Olching, Germany. Various other usable alternatives for fabricating a curved photodetector configuration are disclosed in U.S. Pat. Nos. 6,791,072; 6,849,843; 7,786,421; 8,372,726; 8,742,325; and U.S. Patent Publications 2010/0264502 and 2012/0261551, all of which are hereby incorporated herein by reference in their entirety.

In some embodiments, the photodetector 110 may comprise multiple photodetector arrays which are each nominally flat over a limited span, but are arranged along a curved form of the photodetector 110. For example, a plurality of nominally flat photodetector arrays may be provided on a flexible substrate that extends along the curved form of the photodetector 110. One design consideration in such an embodiment is that each of the photodetector arrays should not receive an unacceptably blurred image of its corresponding portion of the image zone 150. Thus, any lens arrangement 190 and cooperating photodetector 110 should be designed to have complementary curvatures to the extent required to maintain each photodetector or pixel within a desirable image focus depth or range.

Figure 2A:
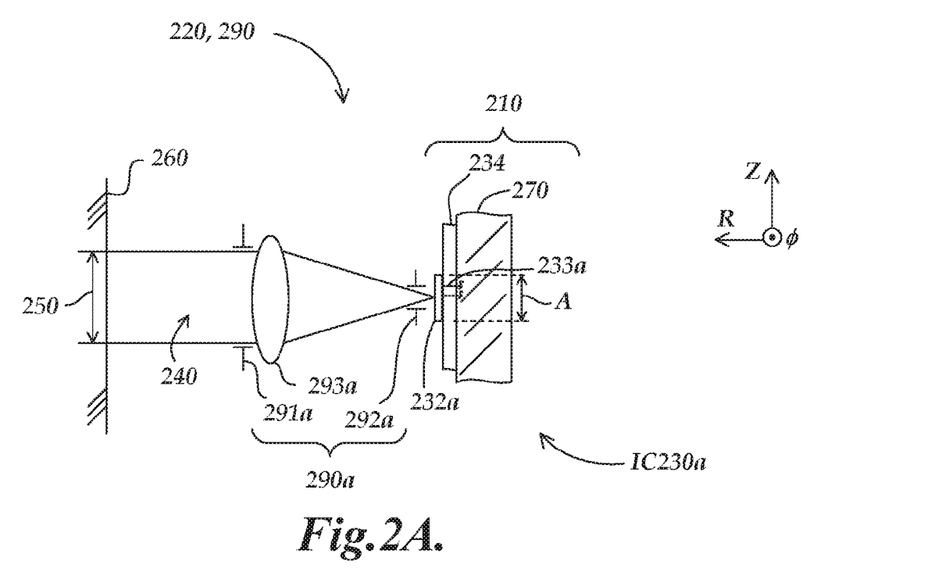
FIGS. 2A and 2B are schematic diagrams of one exemplary embodiment of a photodetector configuration and bore surface imaging arrangement which uses microlenses, usable in the bore imaging system of FIG. 1 to achieve super resolution bore imaging according to principles disclosed herein.
Figure 2B:
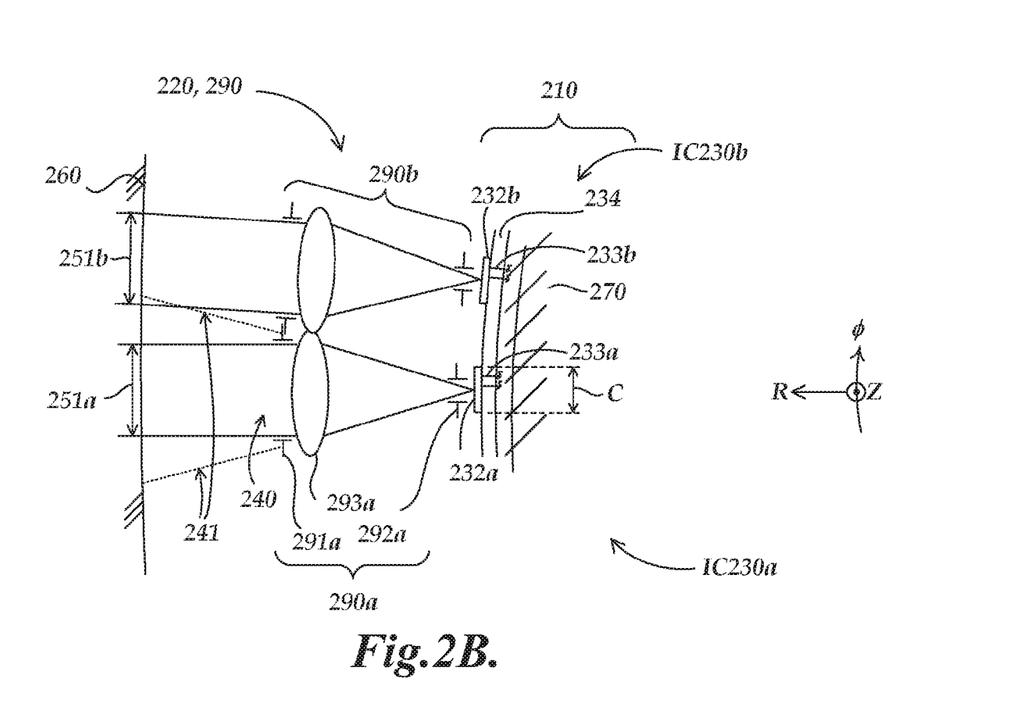

FIGS. 2A and 2B are schematic diagrams of one exemplary embodiment of a photodetector configuration 210 and a bore surface imaging arrangement 220, which uses a lens arrangement 290, usable in the bore imaging system 100 shown in FIG. 1 to achieve super resolution bore imaging according to principles disclosed herein. FIG. 2A shows components of one typical image channel IC230a including a respective one 290a of the lens elements that works in cooperation with a respective one 232a of the imaging pixels. The bore surface imaging arrangement 220 and the photodetector 210 comprise a plurality of similar image channels. Many elements numbered 2XX in FIGS. 2A and 2B may be similar or identical to elements numbered 1XX in FIG. 1, as will be apparent to one of ordinary skill in the art, and may be understood based on previous description or analogy, unless contraindicated.

FIG. 2A shows a side view along a direction normal to the R-Z plane of the image channel IC230a, and FIG. 2B shows a top view of two adjacent image channels IC230a and IC230b along a direction parallel to the axial direction Z. The portion of lens arrangement 290 associated with the image channel IC230a is designated 290a and comprises a limiting aperture 291a located in front of a micro lens 293a and a limiting aperture 292a located at a back focal plane of the micro lens 293a. The portion of lens arrangement 290 associated with the image channel IC230b is designated 290b. The image channel IC230a further comprises an imaging pixel (photodetector element) 232a. The imaging pixel 232a is arranged on (or on part of) a substrate 234 which is attached to a carrier 270. The imaging pixel 232a is coupled to a connection 233a which may be understood as an individual instance of the connections 133 of the bore imaging system 100, in one embodiment. The micro lens 293a and the apertures 291a and 292a are configured to focus nominally collimated light 240 from an imaging zone 250 (FIG. 2A) of a bore surface 260 onto the imaging pixel 232a. In some embodiments, the micro lens 293a may have a magnification (M) of −1. As shown in FIG. 2B, the limiting apertures 291a and 292a are configured to block non-collimated light, such as light rays 241 originating outside a field of view 251a, from entering the image channel IC230a. This prevents light from a region which should nominally be imaged by an adjacent imaging pixel (e.g., from a region in the field of view 251b of the image channel IC230b) from entering the imaging pixel 232a, and therefore suppresses "image cross talk" between adjacent imaging pixels. This may be understood to improve the lateral image resolution of the system. The adjacent image channel IC230b is similarly configured as the image channel IC230a described above, and includes an imaging pixel 232b coupled to a connection 233b. It will also be appreciated that such a lens arrangement also enhances the depth of field, allowing metrology grade imaging of a range of bore sizes. As shown in FIG. 2A, the imaging pixel 232a-232n has a dimension A along the axial direction and, as shown in FIG. 2B, has a dimension C along the circumferential direction. It should be noted that, while FIG. 2B depicts components of the adjacent image channels IC230a and IC230b as separated (distanced) from each other for the purpose of clear illustration, they may be configured and arranged to be nominally adjacent to each other in various embodiments.

Figure 3:
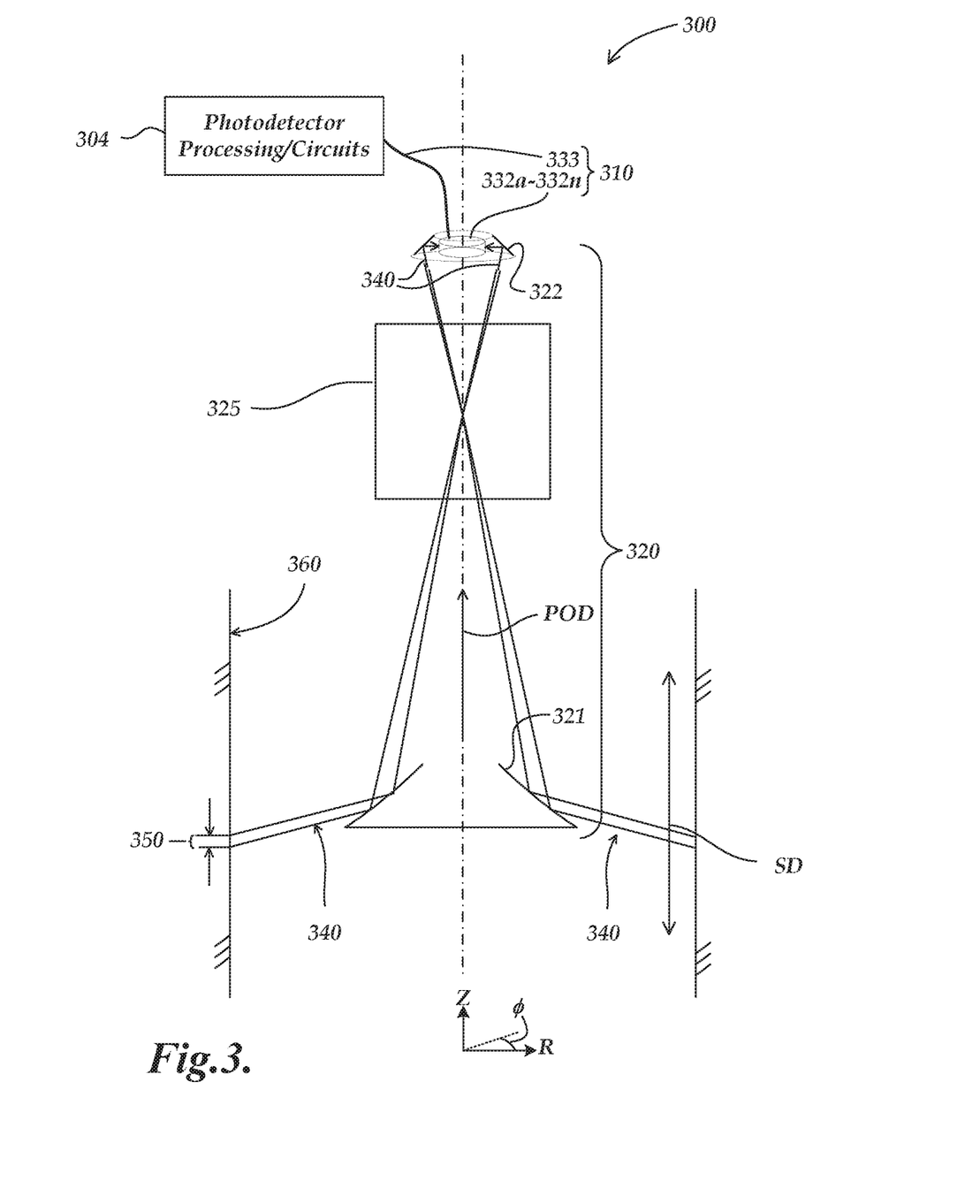
FIG. 3 is a schematic diagram of another exemplary embodiment of a photodetector configuration and bore surface imaging arrangement usable in a bore imaging system to achieve super resolution bore imaging according to principles disclosed herein.

FIG. 3 is a schematic diagram of another exemplary embodiment of a photodetector configuration 310 and a bore surface imaging arrangement 320, usable in a bore imaging system 300 to achieve super resolution imaging according to principles disclosed herein. Many elements numbered 3XX in FIG. 3 may be analogous to or similar to elements numbered 1XX in FIG. 1 (e.g., 310 is analogous to 110), as will be apparent to one of ordinary skill in the art, and may be understood based on previous description or analogy, unless contraindicated. In some cases size or form may be different, but function, fabrication or purpose may be similar, as will be understood by one of ordinary skill in the art based on this disclosure.

In some embodiments, the bore imaging system 300 may include an illumination portion, not shown, (e.g., analogous to the illumination portion 185 shown in in FIG. 1) and may be arranged on a housing member or frame and include a motion control system according to known methods, as previously outlined with reference to the bore imaging system 100 of FIG. 1. The photodetector 310 may be understood to be analogous to the photodetector 110 (and/or 210), only smaller, and may be similarly fabricated to comprise an array of imaging pixels 332a-332n and a substrate. The imaging pixels 332a-332n are coupled to connections 333 which are configured to output image data to photodetector processing circuits 304, as previously outlined. The image data may be processed image data in some embodiments. The bore surface imaging arrangement 320 is significantly different in form from the bore surface imaging arrangements 120 and 220 shown in previous figures. The bore surface imaging arrangement 320 comprises a panoramic imaging arrangement comprising a first reflector element 321 that reflects around 360 azimuth degrees, a lens arrangement 325, and a second reflector element 322 that reflects around 360 azimuth degrees, all located along an optical path between the image zone 350 and the photodetector 310. The first reflector element 321 reflects image light 340 arising from the image zone 350 of the bore surface 360 along a panoramic output direction POD to the lens arrangement 325. The lens arrangement 325 is configured to demagnify (M<1) the image light 340 and transmit it to the second reflector element 322. The second reflector element 322 is arranged to receive the image light 340 from lens arrangement 325, deflect it, and transmit the image light 340 to the photodetector 310 along a direction transverse to the axial direction Z (e.g., approximately along the radial direction R). In such an embodiment the photodetector configuration 310 comprises a cylindrical shape (e.g., extending over a partial or full cylinder) and the direction on the photodetector configuration corresponding to the circumferential direction extends along the circumference of the cylindrical shape. In the embodiment shown in FIG. 3, the first reflector element 321 and the second reflector element 322 appear to have an approximately conical shape. However, it should be appreciated that different shapes of reflector elements may be utilized, for example, to improve image distortions or enhance imaging resolution.

In some embodiments, during operation, the bore imaging system 300 is moved along a scanning direction SD to provide images that cover the bore surface 360 along the axial direction. In alternative embodiments, the bore surface imaging arrangement 320 may comprise image path adjustment elements comprising deformable and/or coordinated movable imaging elements that deflect the field of view and focus of the system 300 axially along the bore surface 360 without having to move the entire bore surface imaging arrangement 320 along the scanning direction SD (along the Z or axial direction). Using modern optical design simulation software and/or ray tracing programs, various configurations for such a system may be realized by one of ordinary skill in the art of optical design.

In some alternative embodiments, the second reflector element 322 may be omitted, and the photodetector configuration may be a planar configuration arranged normal to the panoramic output direction POD, to receive the image light 340 directly from the lens arrangement 325. In such an embodiment, the direction on the photodetector configuration corresponding to the circumferential direction extends along at least one of an arc or a circle on the photodetector configuration.

Figure 4:
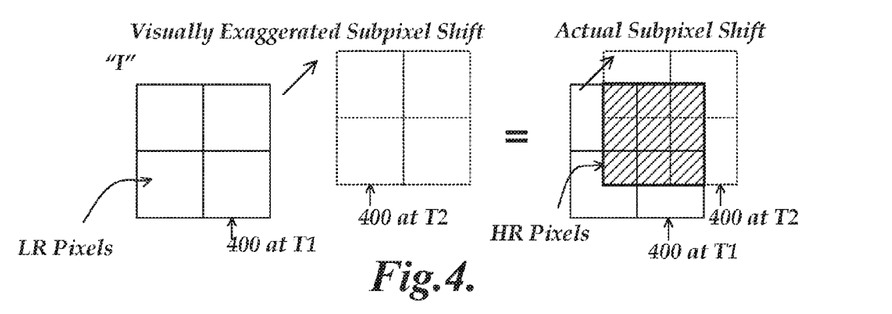
FIG. 4 is a schematic diagram illustrating the concept of multi-frame super resolution imaging.

FIG. 4 is a schematic diagram illustrating the concept of multi-frame super resolution imaging applied to achieve super resolution bore imaging according to various embodiments. Multi-frame super resolution imaging uses signal processing techniques to combine multiple sets of low resolution (LR) image data to mathematically generate a set of high resolution (HR) image data. Another way of describing this super resolution imaging process is to say that it provides finer image resolution than the original raw pixel image resolution, by providing an increased number of virtual HR imaging pixels, or image data locations, per unit image area. By convention herein, these higher resolution (HR) virtual pixel locations are referred to as "HR pixels" or the "HR grid", in contrast to the lower resolution (LR) pixels in the raw images. FIG. 4 illustrates a 2×2 array of imaging pixels 400, which may be considered a representative portion of a photodetector array used to acquire a first set of low resolution image data of a target, at a resolution of 2×2 per image area I, at time T1. The 2×2 array of imaging pixels 400 is then shifted relative to the target, along one or more directions, by a distance corresponding to a subpixel size along the one or more directions. One exemplary shift is shown with an exaggerated displacement at the left side of FIG. 4. At the right side of FIG. 4, the 2×2 array of imaging pixels 400 is shown realistically shifted along the same direction for an exemplary subpixel shift of 0.5 pixel, to acquire a second set of low resolution image data of the target, at the same low resolution of 2×2 per image area I, at time T2. More generally, a plurality of such acquired sets of image data (e.g., including additional acquired image data resulting from additional subpixel offset amounts and/or directions) may be processed using a suitable multi-frame super resolution algorithm to combine the acquired plurality of sets of low resolution image data to compute a corresponding set of super resolution image data (e.g., comprising the HR pixels shown in FIG. 4) where there is shared or congruent image data in the sets of image data. This corresponds to the overlapping area shown with hatching in FIG. 4, which may have approximately two times higher resolution (that is a density of 4×4 per image area I) in the illustrated example. It will be understood that in contrast to this 2×2 example, a large photodetector array may have a large uninterrupted area of HR pixels. Various multi-frame super resolution algorithms are known in the art, most of which mathematically construct a set of super resolution image data from an acquired plurality of sets of low resolution image data. One such algorithm which is fast and robust and suited for application in various embodiments is described by Farsiu et al. (Farsiu, S.; Robinson, M. D.; Elad, M.; Milanfar, P., "Fast and robust multiframe super resolution", in Image Processing, IEEE Transactions on Image Processing, vol. 13, no. 10, pp. 1327-1344, October 2004). Other algorithms may also be suited for application in various embodiments, as will be apparent to those skilled in the art.

As outlined in greater detail below, in various embodiments, an axial motion scan mode or positioning adjustment of the super resolution bore imaging system is used in combination with a photodetector configuration having an advantageous pixel geometry configured to interact with the axial motion in an efficient manner, to provide a plurality of combinable sets of image data, to provide a super resolution (e.g., microscopic) bore inspection image with high throughput. A scan mode means a mode of scanning to image various segments of the bore surface 160 using the system. The scan mode may be controlled by relative movement of the bore imaging system 100 (or 300) with respect to the bore surface 160 along the axial scanning direction SD and/or by adjustment of the imaging path of the bore imaging system 100 (or 300) relative to the bore surface 160. In some embodiments, a suitable motion control mechanism may also be provided to achieve relative movement along the circumferential direction between the bore imaging system 100 (or 300) and the bore surface 160. Alternatively or additionally, some commercially available photodetector arrays may be controlled or configured to read out a selected or addressable subset of photodetector pixels to thereby achieve selective scanning of various segments of the bore surface 160. One such device is the Kodak KAI-0340 image sensor operating in a high frame rate partial scan mode of operation, available from Truesense Imaging, Inc., Rochester, N.Y., and others.

Referring back to FIG. 1, the controller 106 of the bore imaging system 100 includes necessary circuitry, processors, and the like, such as the photodetector processing circuits 104 and the motion control 102, to controlling the scan mode of the bore imaging system 100 to acquire a plurality of sets of ("low resolution") image data having sub-pixel offsets from one another. The controller 106 is further configured to execute a multi-frame super resolution algorithm to combine the plurality of acquired sets of image data to provide a corresponding set of super resolution image data having a resolution that is finer than the resolution of the low resolution image data.

FIGS. 5A-5E are schematic diagrams of five (5) exemplary embodiments of pixel pattern geometries or arrangements usable in a photodetector configuration (e.g., the photodetector configuration 110), that are particularly suitable for use in combination with a scan mode that is suitable in a bore imaging system (e.g., an axial scan mode including axial position measurement) to efficiently acquire multiple sets of low resolution image data suitable for super resolution processing.

Figure 5A:
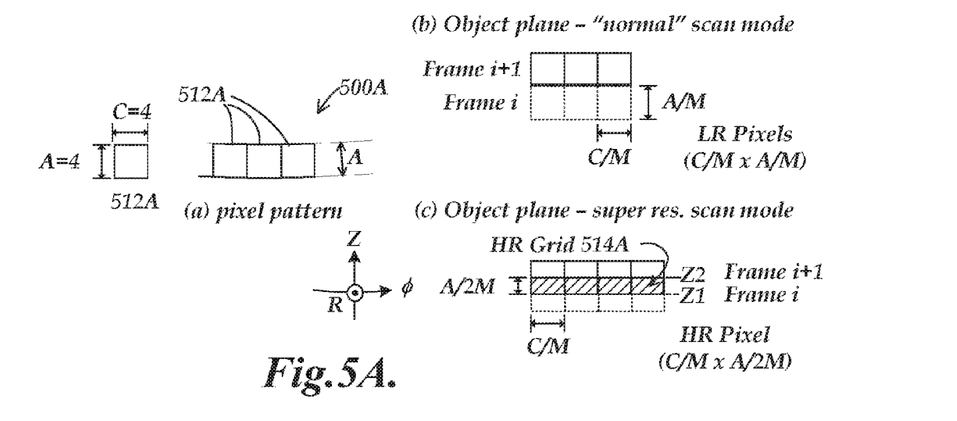
FIGS. 5A-5E are schematic diagrams of five (5) exemplary embodiments of pixel pattern geometries or arrangements usable in a photodetector configuration in various embodiments of a super resolution bore imaging system according to principles disclosed herein.

FIG. 5A illustrates a pixel pattern, labeled "(a)", for a first pixel geometry 500A comprising a (first) set of pixels 512A. The pixels are sized C μm×A μm, or 4 μm×4 μm in the particular illustrated embodiment. While FIG. 5A shows only three pixels 512A arranged adjacent to each other along a the photodetector configuration "circumferential direction", it will be understood in FIGS. 5A-5E that the illustrated pixels may represent a small portion of those arranged along the photodetector configuration circumferential direction. In some figures, the axis φ and certain pixel borders are shown as curved to schematically represent a curved or circular photodetector configuration circumferential direction on a cylindrical or planar photodetector configuration, respectively. It will be understood that all pixel geometries schematically illustrated herein are compatible with such photodetector configurations. In various embodiments, it may be advantageous if each set of pixels included in the photodetector configuration is relatively elongated along the direction on the photodetector configuration corresponding to the circumferential direction and relatively short along the direction on the photodetector configuration corresponding to the axial direction. For example, in one exemplary embodiment according to principles disclosed herein, one or more set of pixels (e.g., a set of pixels described below) may be arranged on a planar photodetector configuration along a circle corresponding to the circumferential direction. In one embodiment the circle may have a diameter of approximately 10 mm and may comprise about 4000 to 8000 pixels. Using known pixel readout techniques and other techniques as disclosed herein, a bore surface axial dimension of 160 mm can be imaged using such a photodetector configuration, at a frame rate of 1 kHz, in 8 seconds or less, and provide the raw images needed to provide a super resolution image of the bore surface according to the principles disclosed herein.

FIG. 5A portions (b) and (c) illustrate pixel locations at the object plane on a bore wall of a "normal" scan mode and a super resolution scan mode, respectively. In the examples of FIGS. 5A-5E, a bore surface imaging arrangement provides an optical magnification M of 0.1 such that, as shown in the portions (b) and (c) of FIG. 5A for example, a "surface pixel unit size" of C/M μm×A/M μm on the object plane (at the bore surface 160), or 40 μm×40 μm in this particular example, can be imaged onto a corresponding pixel that is sized C=4 μm×A=4 μm.

In the normal scan mode (shown in portion (b) of FIG. 5A), the scan mode is configured such that the change of the imaging-Z coordinate between successive frames (Frame i and Frame i+1) is approximately the same as the maximum dimension A of the pixels. In the super resolution scan mode, on the other hand, the scan mode is configured such that the change of the imaging-Z coordinate between successive frames is a subpixel distance (e.g., 0.5 pixels in the example shown in portion (c) of FIG. 5A). That is, the set of pixels 512A may be positioned or adjusted, relative to the bore surface segment to be imaged, at a first imaging-Z coordinate Z1 along the axial direction Z to acquire Frame 1, then positioned or adjusted, relative to the bore surface segment to be imaged, at a second imaging-Z coordinate $Zi=Z1+k(A/M)$ or $Zi=Z1-k(A/M)$ to acquire Frame i=2, where k is less than 1.0 (e.g., k may be at most 0.3, or 0.5, or 0.7 in various desirable embodiments) and M is the optical magnification of the bore surface imaging arrangement 120. In some such embodiments, the first set of image data represented by Frame 1 is acquired during a first exposure period using the set of pixels 512A, and the second set of image data represented by Frame i=2 is acquired during a second exposure period using the same set of pixels 512A. These raw image frames (and additional raw images, in some embodiments) can then be combined, using a suitable multi-frame super resolution algorithm, to generate a super resolution image data having the surface unit pixel size of C/M μm×A/2M μm, or 40 μm×20 μm in this particular example. The surface unit pixel size refers to the "image unit" on the object plane that is imaged onto one pixel, as outlined above. That is, in this example the resolution along the scan direction (Z direction in the illustrated example) of the super resolution (or high resolution HR) image data becomes approximately two times better than the resolution of the raw frames (or low resolution LR) image data. Thus, the super resolution bore imaging system and method according to principles disclosed herein can achieve a high resolution (HR) grid 514A having the surface unit pixel size of 40 μm×20 μm in this example.

Figure 5B:
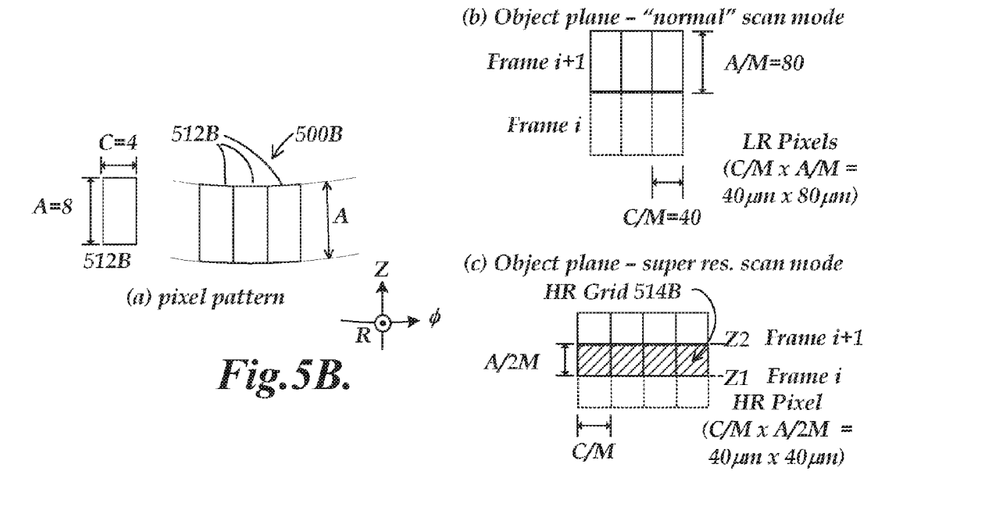

FIG. 5B illustrates a pixel pattern, labeled "(a)", for a second pixel geometry 500B comprising a (first) set of pixels 512B. The pixels are sized C μm×A μm, or 4 μm×8 μm in this particular embodiment. Other than the difference in the pixel maximum dimension A, the features of FIG. 5B are the same as those of FIG. 5A, and the scan mode operations of the set of pixels 512B may be understood by analogy with that described with reference to FIG. 5A. That is, the set of pixels 512B may be positioned or adjusted, relative to the bore surface segment to be imaged, at a first imaging-Z coordinate Z1 along the axial direction Z to acquire Frame 1, then positioned or adjusted, relative to the bore surface segment to be imaged, at a second imaging-Z coordinate $Zi=Z1+k(A/M)$ or $Zi=Z1-k(A/M)$ to acquire Frame i=2, where k is less than 1.0, as previously outlined with reference to FIG. 5A. In the illustrated example, k=0.5. These raw image frames (and additional raw images, in some embodiments) can then be combined, using a suitable multi-frame super resolution algorithm. Thus, a super resolution bore imaging system and method according to principles disclosed herein can achieve a high resolution (HR) grid 514B having the surface unit pixel size of 40 μm×40 μm in this example using the pixel geometry of the set of 4 μm×8 μm pixels 512B.

It will be understood based on previous description that, in other embodiments or implementations, using different offset amounts between respective imaging-Z coordinates Zi=Z1, Z2, and so on, different super resolution image data having different surface unit pixel size or resolution may be achieved. For example, using a plurality of raw images acquired at $Z_{1+i}=Z_1+0.25(A/M)$, ideally, super resolution image data having the surface unit pixel size of approximately C/M μm×A/4M μm may be obtained. Thus, the illustrated examples are exemplary only, and not limiting.

Figure 5C:
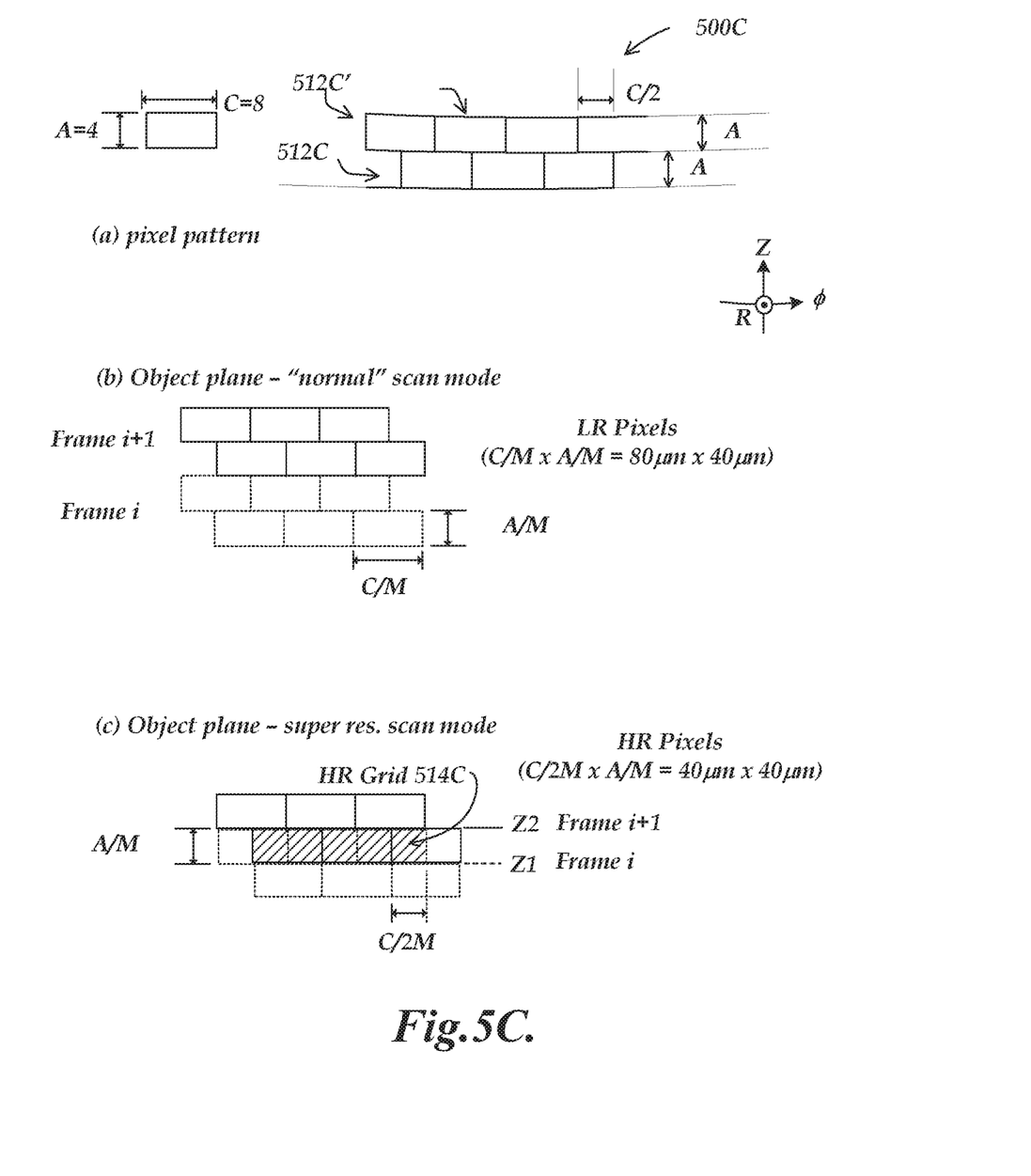

FIG. 5C illustrates a pixel pattern labeled "(a)", for a third pixel geometry 500C comprising a (first) set of pixels 512C and a (second) set of pixels 512C'. As compared to the embodiment of FIG. 5A, the pixels in the sets are elongated perpendicular to the scanning direction Z to be sized with C=2 A, or 8 μm×4 μm in this particular embodiment, to thereby double the surface unit pixel size perpendicular to the scanning direction Z to 80 μm×40 μm. In addition, the pixel set 512C' is offset relative to the pixel set 512C along the circumferential direction φ, at an offset that is less than 1.0 times the pixel size C along the circumferential direction.

FIG. 5C portions (b) and (c) illustrate pixel locations at the object plane on a bore wall of a "normal" scan mode and a super resolution scan mode, respectively. In the normal scan mode illustrated in portion (b) of FIG. 5C, the scan mode is configured such that the change of the imaging-Z coordinate between successive frames (Frame i and Frame i+1) is approximately the same as two times the maximum dimension A of the pixels, that is, the same as the combined dimensions A of the two sets of pixels.

In the super resolution scan mode illustrated in portion (c) of FIG. 5C, on the other hand, the scan mode is configured such that the change of the imaging-Z coordinate between successive frames is the same as the dimension A of the pixels in each of the sets 512C and 512C'. In this case, set of pixels 512C may be positioned or adjusted in Frame i+1 to image the bore segment using the same imaging Z-coordinate as the set of pixels 512C' used in Frame i. In this case, the second imaging-Z coordinate $Zi=Z1+k(A/M)$ or $Zi=Z1-k(A/M)$ used to acquire Frame i=2 of the imaged bore segment, does not fulfill the condition where k is less than 1.0 (a subpixel axial offset is not used). However, it will be appreciated that due to the pixel set 512C' being offset relative to the pixel set 512C along the circumferential direction φ, at an offset that is less than 1.0 times the pixel size C, a condition is satisfied which provides a respective imaging-φ coordinate φi along the circumferential direction satisfying the condition $φi=φ1+j(C/M)$ or $φi=φ1-j(C/M)$, where j is a number less than 1.0. As a result, the set of super resolution image data of the bore surface segment represented by the HR Grid 514C, shown in portion (c) of FIG. 5C, has a resolution along the circumferential direction that is finer than the raw data resolution along the circumferential direction. In the particular embodiment illustrated, the offset is approximately 0.5*C or C/2. Thus, in this particular example the resolution along the circumferential direction of the super resolution (or high resolution HR) image data becomes approximately two times better than the resolution of the raw frames (or low resolution LR) image data. Thus, a super resolution bore imaging system and method according to principles disclosed in FIG. 5C can achieve a high resolution (HR) grid 514C having the surface unit pixel size of 40 μm×40 μm in this example using the pixel geometry 500C comprising of the two sets of 4 μm×8 μm pixels 512C and 512C'.

It will be understood based on previous description (where N=2) that other embodiments or implementations may use a different number of N sets of pixels offset by C/N along the circumferential direction. Then by acquiring a corresponding plurality of at least N raw images which image the bore segment using the same imaging Z-coordinate for each set of pixels, super resolution image data having the surface unit pixel size of approximately A/M μm×C/NM μm may ideally be obtained. Thus, the illustrated example is exemplary only, and not limiting.

Figure 5D:
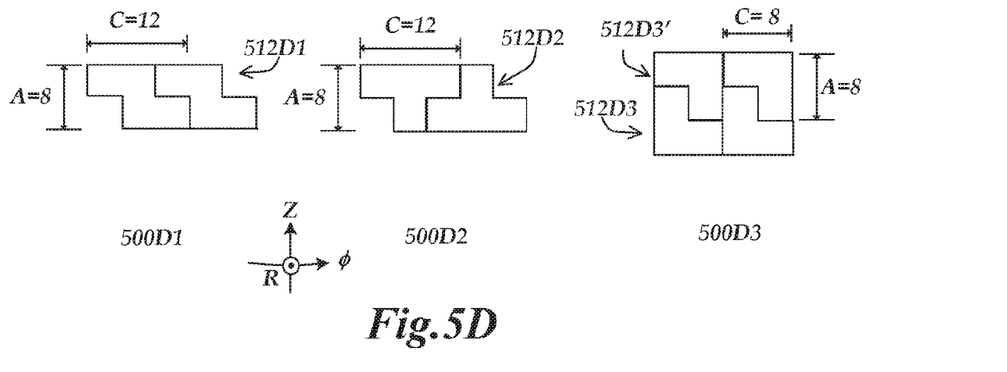

FIG. 5D illustrates a fourth, fifth and sixth pixel geometries 500D1, 500D2 and 500D3, respectively. The single set of Z-shaped pixels of the pixel geometry 500D1 and the single set of T-shaped pixels of the pixel geometry 500D2 show pixels that have a maximum dimension A=8 μm along the axial direction Z and maximum dimension C=12 μm along the circumferential direction φ. The sets of pixels in the pixel geometries 500D1 and 500D2 comprise pixels having a shape that is not a quadrilateral, and the plurality of pixels are shaped such that they fit together in a tiled pixel pattern along the direction corresponding to the circumferential direction φ.

Figure 5E:
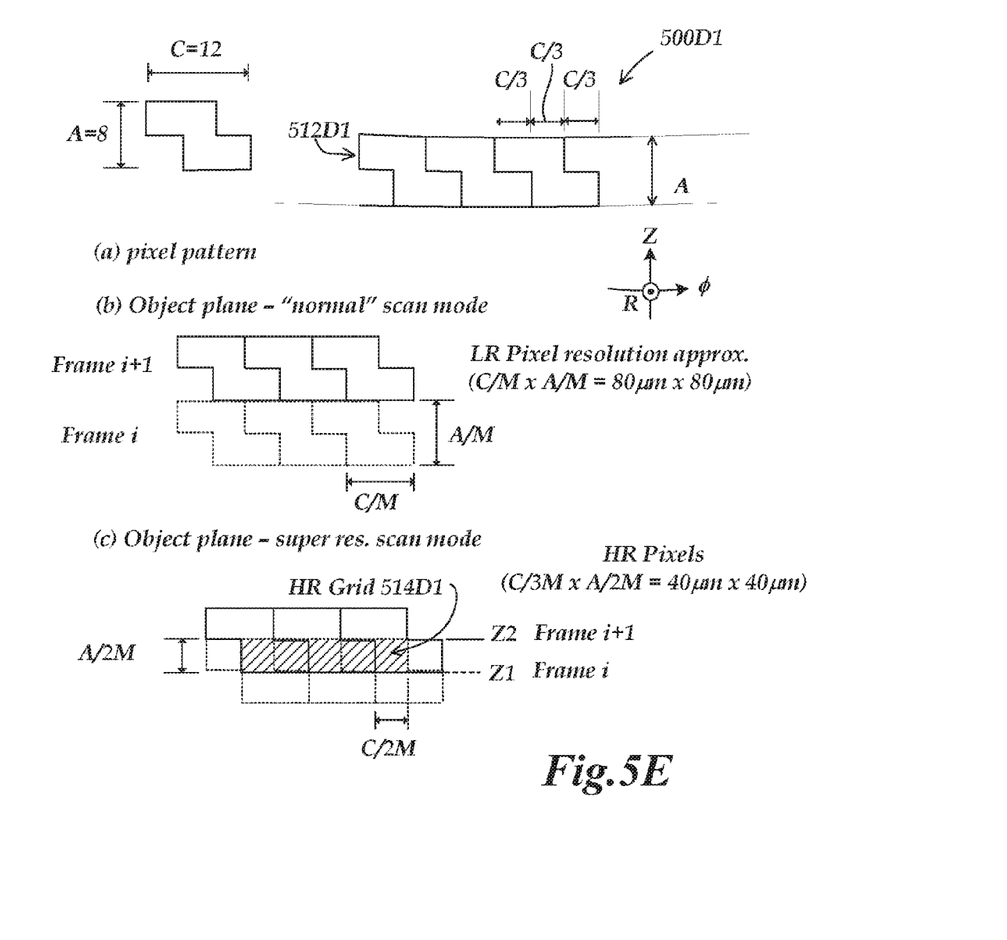

FIG. 5E portion (a) shows an additional aspect of the pixel geometry 500D1 of FIG. 5D. It can be seen that there are pixel boundaries in the set of pixels 512D1 spaced apart by the dimension C/3, which define the resulting HR Grid of a processed super resolution image as described further below. Portions (b) and (c) of FIG. 5E illustrate pixel locations at the object plane on a bore wall of a "normal" scan mode and a super resolution scan mode, respectively. In the normal scan mode illustrated in portion (b) of FIG. 5E, the scan mode is configured such that the change of the imaging-Z coordinate between successive frames (Frame i and Frame i+1) is approximately the same as the maximum dimension A of the pixels in the set of pixels 512D1.

On the other hand, in the super resolution scan mode illustrated in portion (c) of FIG. 5E, the scan mode is configured such that the change of the imaging-Z coordinate between successive frames is half of the dimension A of the pixels in the set of pixels 512D1. In this case, the second imaging-Z coordinate $Zi=Z1+k(A/M)$ or $Zi=Z1-k(A/M)$ used to acquire Frame i=2 of the imaged bore segment, fulfills the condition where k is less than 1.0 (a subpixel axial offset is used). In addition, it will be appreciated that due to the shape of the pixels in the pixel set 512D1, and in particular the boundaries in the set of pixels 512D1 spaced apart by the dimension C/3 (as shown in portion (a) of FIG. 5E), this change in the imaging Z-coordinate combines or interacts with the pixel shape to provide an HR Grid 514C, shown in portion (c) of FIG. 5C. The HR Grid 514C has a resolution of C/3M (or 40 um) along the circumferential direction due to the pixel shape, which is finer than the raw data resolution along the circumferential direction, and a resolution of 0.5 AM or A/2M (or 40 μm) along the axial direction due to the imaging-Z coordinates used for the raw images, which is finer than the raw data resolution along the axial direction. Thus, a super resolution bore imaging system and method according to principles disclosed in FIG. 5E can achieve a high resolution HR Grid 514D1 having the surface unit pixel size of 40 μm×40 μm in this example, using the pixel geometry 500D1 comprising of the set 512D1 of Z-shaped 8 μm×12 μm pixels.

Based on the foregoing description of the pixel geometry 500D1 and the related super resolution scan mode operations, it will be understood by analogy that the pixel geometry 500D2 shown in FIG. 5D may also provide a high resolution (HR) grid having the same HR resolution as the HR Grid 514D1, except using the set 512D2 of T-shaped 8 μm×12 μm pixels.

The pixel geometry 500D3 shown in FIG. 5D comprises a (first) set of L-shaped pixels 512D3 and a (second) set of L-shaped pixels 512D3'. The pixel geometry 500D3 illustrates one exemplary embodiment wherein first and second sets of pixels comprise a plurality of pixels having a shape that is not a quadrilateral, and the first and second sets of pixels are shaped such that they fit together in a tiled pixel pattern along the directions corresponding to both the axial and circumferential directions. Based on the foregoing description of the pixel geometry 500D1 and the related super resolution scan mode operations, it will be understood by analogy that the pixel geometry 500D3 shown in FIG. 5D, when used with similar imaging Z-coordinates to acquire a plurality of raw images of a bore segment, may also provide a high resolution (HR) grid having the same HR resolution as the HR Grid 514D1, except using the tiled sets 512D3 and 512D3' of L-shaped 8 μm×8 μm pixels.

It will be appreciated that although the pixel geometry 500D3 includes a tiled pattern comprising 2 sets of L-shaped pixel, other pixel shapes arranged in 2 or 3 sets may be interleaved or tiled in an analogous manner and used in various embodiments according to the principles disclosed herein. Thus, the illustrated example is exemplary only, and not limiting.

Figure 6:
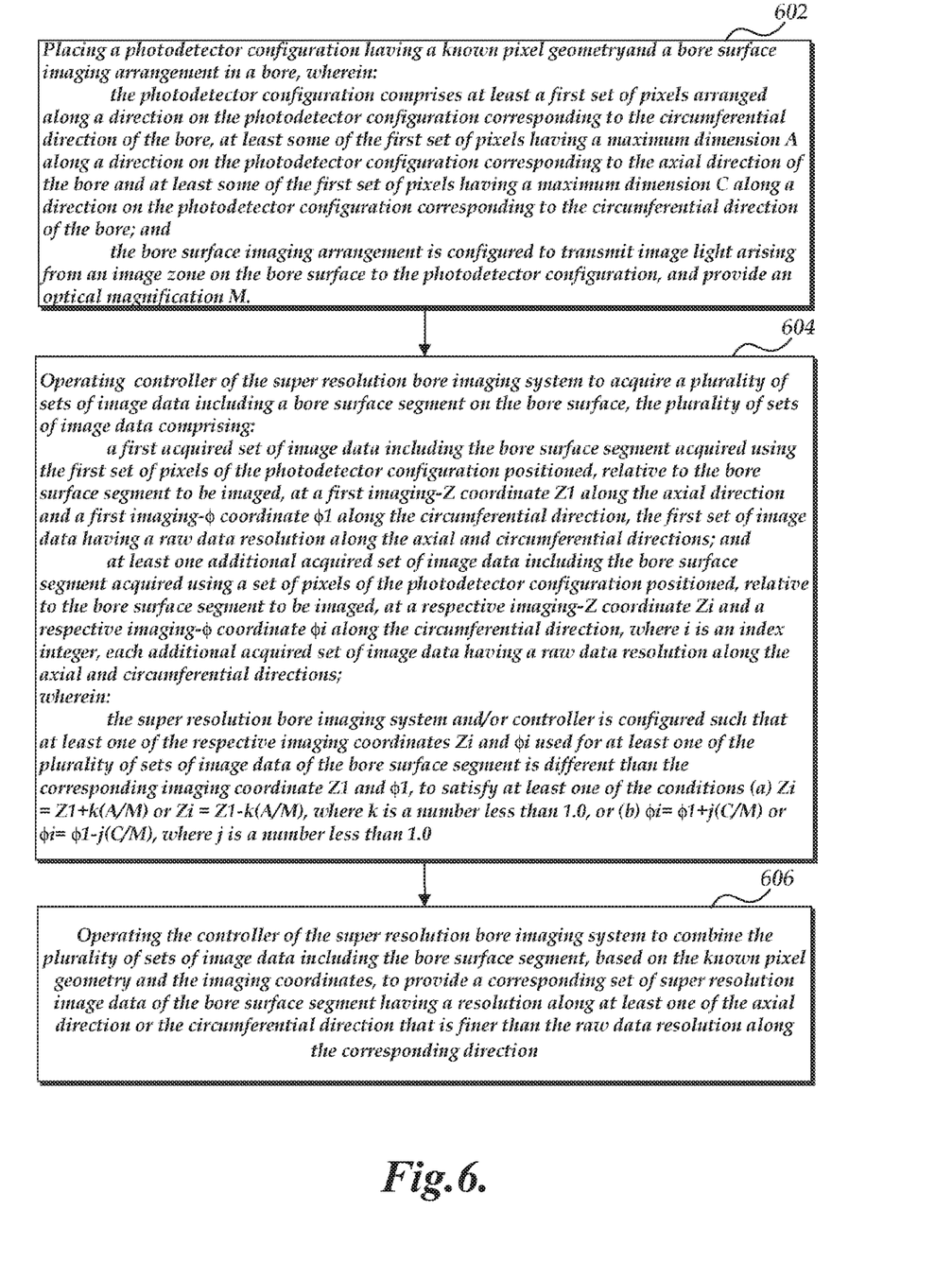
FIG. 6 is a flow chart of a method of super-resolution imaging a bore surface according to principles disclosed herein.

FIG. 6 is a flow chart of a method of super-resolution imaging a bore surface according to principles disclosed herein. In step 602, components of a super resolution bore imaging system comprising a photodetector configuration having a known pixel geometry and a bore surface imaging arrangement are placed in a bore, wherein: the photodetector configuration comprises at least a first set of pixels arranged along a direction on the photo detector configuration corresponding to the circumferential direction of the bore, at least some of the first set of pixels having a maximum dimension A along a direction on the photo detector configuration corresponding to the axial direction of the bore and at least some of the first set of pixels having a maximum dimension C along a direction on the photo detector configuration corresponding to the circumferential direction of the bore; and the bore surface imaging arrangement is configured to transmit image light arising from an image zone on the bore surface to the photo detector configuration, and provide an optical magnification M.

In step 604, the controller of the super resolution bore imaging system operates to acquire a plurality of sets of image data including a bore surface segment on the bore surface, the plurality of sets of image data comprising: a first acquired set of image data including the bore surface segment acquired using the first set of pixels of the photodetector configuration positioned, relative to the bore surface segment to be imaged, at a first imaging-Z coordinate Z1 along the axial direction and a first imaging-φ coordinate φ1 along the circumferential direction, the first set of image data having a raw data resolution along the axial and circumferential directions; and at least one additional acquired set of image data including the bore surface segment acquired using a set of pixels of the photodetector configuration positioned, relative to the bore surface segment to be imaged, at a respective imaging-Z coordinate Zi and a respective imaging-φ coordinate φi along the circumferential direction, where i is an index integer, each additional acquired set of image data having a raw data resolution along the axial and circumferential directions, wherein: the super resolution bore imaging system and/or controller is configured such that at least one of the respective imaging coordinates Zi and φi used for at least one of the plurality of sets of image data of the bore surface segment is different than the corresponding imaging coordinate Z1 and φ1, to satisfy at least one of the conditions (a) Zi=Z1+k(A/M) or Zi=Z1−k(A/M), where k is a number less than 1.0, or (b) φi=φ1+j(C/M) or φi=φ1−j(C/M), where j is a number less than 1.0. As outlined previously, the format of the expression for condition (b) is chosen to emphasize the principle of providing a subpixel offset of the imaging coordinate. However, it will be understood that C may be converted from a linear pixel dimension (e.g., as expressed in the figures) to an appropriate corresponding number of degrees or radians for dimensional consistency in this expression. It will be appreciated that these conditions correspond to an imaging coordinate or pixel position having a sub-pixel offset along at least one direction between respective images in the acquired sets of image data.

In step 606, the controller operates to combine the plurality of sets of image data including the bore surface segment, based on the known pixel geometry and the imaging coordinates, to provide a corresponding set of super resolution image data of the bore surface segment having a resolution along at least one of the axial direction or the circumferential direction that is finer than the raw data resolution along the corresponding direction.

In the drawings and related description outlined above, the illustrated pixel patterns and/or pixel geometries generally show one row or a few rows of pixels (a row extending along the circumferential direction). It will be appreciated that these may be regarded as representative rows, used to disclose basic principles herein, and that in various embodiments a set (or sets) of pixels included in a photodetector configuration according to this invention may comprise one such row of pixels or multiple rows. Multiple rows of pixels may be configured to be adjacent to one another along a direction corresponding to the axial direction in some embodiments. It will be appreciated that the size of the image zone on the bore surface generally corresponds to the size of the set of pixels (for any one set of image data). Thus, when using relatively larger sets of pixels, it may be possible to image an entire bore using relatively fewer and larger image zones. Within each image zone, the image acquisition and processing disclosed and claimed herein is appropriate.

According to principles disclosed herein, a high-resolution metrology-grade bore imaging system need not rely solely on small pixel size to achieve high resolution imaging. Various embodiments disclosed herein provide advantageous combinations of resolution, economy, pixel SNR, and throughput that are not available in previously known bore imaging systems. While various embodiments have been illustrated and described, numerous variations in the illustrated and described arrangements of features and sequences of operations will be apparent to one skilled in the art based on this disclosure. In particular, various features described in detail with respect to respective embodiments may be combined or substituted to produce further combinations of features to achieve super resolution bore imaging systems and methods according to principles disclosed herein. Thus, it will be appreciated that various changes can be made therein without departing from the spirit and scope of the invention.

The embodiments of the invention in which an exclusive property or privilege is claimed are defined as follows:

1. A super resolution bore imaging system for imaging a bore surface inside an approximately cylindrical bore, the bore surface extending along an axial direction and along a circumferential direction transverse to the axial direction, the bore imaging system comprising:
   a photodetector configuration having a known pixel geometry comprising at least a first set of pixels arranged along a direction on the photodetector configuration corresponding to the circumferential direction, at least some of the first set of pixels having a maximum dimension A along a direction on the photodetector configuration corresponding to the axial direction and at least some of the first set of pixels having a maximum dimension C along a direction on the photodetector configuration corresponding to the circumferential direction;
   a bore surface imaging arrangement configured to transmit image light arising from an image zone on the bore surface to the photodetector configuration, and provide an optical magnification M; and
   a controller configured to:
      operate the super resolution bore imaging system to acquire a plurality of sets of image data including a bore surface segment on the bore surface, the plurality of sets of image data comprising:
         a first acquired set of image data including the bore surface segment acquired using the first set of pixels of the photodetector configuration positioned, relative to the bore surface segment to be imaged, at a first imaging-Z coordinate Z1 along the axial direction and a first imaging-φ coordinate φ1 along the circumferential direction, the first set of image data having a raw data resolution along the axial and circumferential directions; and
         at least one additional acquired set of image data including the bore surface segment acquired using a set of pixels of the photodetector configuration positioned, relative to the bore surface segment to be imaged, at a respective imaging-Z coordinate Zi and a respective imaging-φ coordinate φi along the circumferential direction, where i is an index integer, each additional acquired set of image data having a raw data resolution along the axial and circumferential directions;
   wherein:
      the super resolution bore imaging system is configured such that at least one of the respective imaging coordinates Zi and φi used for at least one of the plurality of sets of image data of the bore surface segment is different than the corresponding imaging coordinate Z1 and φ1, to satisfy at least one of conditions (a) Zi=Z1+k(A/M) or Zi=Z1−k(A/M), where k is a number less than 1.0, or (b) φi=φ1+j(C/M) or φi=φ1−j(C/M), where j is a number less than 1.0; and
      the controller is configured to combine the plurality of sets of image data including the bore surface segment, based on the known pixel geometry and the imaging coordinates, to provide a corresponding set of super resolution image data of the bore surface segment having a resolution along at least one of the axial direction or the circumferential direction that is finer than the raw data resolution along the corresponding direction.

2. The super resolution bore imaging system of claim 1, wherein the condition (a) is satisfied, and the super resolution bore imaging system is moved along the axial direction to change the imaging-Z coordinate between acquiring at least two of the plurality of sets of image data, and the set of super resolution image data of the bore surface segment has a resolution along the axial direction that is finer than the raw data resolution along the axial direction.

3. The super resolution bore imaging system of claim 2, wherein:
the plurality of sets of image data comprise N sets of image data, where N is at least two;
each of the N sets of image data is acquired during a respective exposure period using the first pixel set; and
the super resolution bore imaging system is moved along the axial direction to change the imaging-Z coordinate between the N sets of image data.

4. The super resolution bore imaging system of claim 3, wherein the super resolution bore imaging system is moved along the axial direction to change the imaging-Z coordinate between acquiring the plurality of sets of image data such that k is approximately 1/N, and the imaging-Z coordinates of the plurality of sets of image data are approximately evenly spaced along the axial direction.

5. The super resolution bore imaging system of claim 2, wherein the super resolution bore imaging system comprises a strobe light source, and the controller is configured to:
move the super resolution bore imaging system along the axial direction continuously while acquiring the plurality of sets of image data; and
operate the strobe light source to provide a respective image exposure timed to occur at a respective imaging-Z coordinate, in order to acquire each of the plurality of sets of image data.

6. The super resolution bore imaging system of claim 2, wherein the pixels of the first pixel set comprise pixels having a shape that is not a quadrilateral, and the plurality of pixels are shaped such that they fit together in a tiled pixel pattern along the direction corresponding to the circumferential direction.

7. The super resolution bore imaging system of claim 6, wherein:
the controller is configured to combine the plurality of sets of image data provided by the combination of the tiled pixel pattern and the movement along the axial direction to provide a corresponding set of super resolution image data of the bore surface segment having a resolution along each of the axial and circumferential directions that is finer than the raw data resolution along the corresponding direction.

8. The super resolution bore imaging system of claim 6, wherein the maximum dimension A is less than the maximum dimension C.

9. The super resolution bore imaging system of claim 1, wherein:
the at least a first set of pixels comprises the first set of pixels arranged along a direction on the photodetector configuration corresponding to the circumferential direction and a second set of pixels arranged along the direction on the photodetector configuration corresponding to the circumferential direction;
the first and second sets of pixels are at different locations along the direction on the photodetector configuration corresponding to the axial direction;
the second set of pixels are offset from the first set of pixels along the direction on the photodetector configuration corresponding to the circumferential direction, at an offset less than C;
the controller configured to operate the super resolution bore imaging system to acquire the plurality of sets of image data, including: acquiring the first acquired set of image data during a first exposure period using the first set of pixels at the first imaging-Z coordinate Z1; and
acquiring at least one additional acquired set of image data during a respective exposure period using the second set of pixels at a respective imaging-Z coordinate Zi, wherein the controller is configured to move the super resolution bore imaging system along the axial direction after acquiring the first acquired set of image data in order to use the second set of pixels at the respective imaging-Z coordinate Zi.

10. The super resolution bore imaging system of claim 9, wherein the first set of pixels are offset from the second set of pixels along the direction on the photodetector configuration corresponding to the circumferential direction, at an offset of 0.5 C.

11. The super resolution bore imaging system of claim 9, wherein:
the controller is configured to move the super resolution bore imaging system along the axial direction after acquiring the first acquired set of image data in order to use the second set of pixels at a respective imaging-Z coordinate Zi such that k is an integer and condition a) is not satisfied, and condition b) is satisfied by the offset of the second set of pixels from the first set of pixels at the offset less than C along the direction on the photodetector configuration corresponding to the circumferential direction, which provides a respective imaging-$\varphi$ coordinate $\varphi i$ along the circumferential direction satisfying the condition $\varphi i = \varphi 1 + j(C/M)$ or $\varphi i = \varphi 1 - j(C/M)$, where j is a number less than 1.0; and
the set of super resolution image data of the bore surface segment has a resolution along the circumferential direction that is finer than the raw data resolution along the circumferential direction.

12. The super resolution bore imaging system of claim 9, wherein:
the controller is configured to move the super resolution bore imaging system along the axial direction after acquiring the first acquired set of image data in order to use the second set of pixels at a respective imaging-Z coordinate Zi such that k is a number less than 1.0 and condition a) is satisfied, and condition b) is satisfied by the offset of the second set of pixels from the first set of pixels at the offset less than C along the direction on the photodetector configuration corresponding to the circumferential direction, which provides a respective imaging-$\varphi$ coordinate $\varphi i$ along the circumferential direction satisfying the condition $\varphi i = \varphi 1 + j(C/M)$ or $\varphi i = \varphi 1 - j(C/M)$, where j is a number less than 1.0; and
the set of super resolution image data of the bore surface segment has a resolution along each of the axial and circumferential directions that is finer than the raw data resolution along the corresponding direction.

13. The super resolution bore imaging system of claim 12, wherein the first set of pixels comprise a plurality of pixels having a shape that is not a quadrilateral, and the second set of pixels comprise a plurality of pixels having a shape that is not a quadrilateral, and the first and second sets of pixels are shaped such that they fit together in a tiled pixel pattern along the directions corresponding to both the axial and circumferential directions.

14. The super resolution bore imaging system of claim 9, wherein the super resolution bore imaging system comprises a strobe light source, and the controller is configured to:

move the super resolution bore imaging system along the axial direction continuously while acquiring the plurality of sets of image data; and operate the strobe light source to provide a respective image exposure timed to occur at a respective imaging-Z coordinate, in order to acquire each of the plurality of sets of image data.

15. The super resolution bore imaging system of claim 1, wherein each set of pixels included in the photodetector configuration is relatively elongated along the direction on the photodetector configuration corresponding to the circumferential direction and relatively short along the direction on the photodetector configuration corresponding to the axial direction.

16. The super resolution bore imaging system of claim 15, wherein the photodetector configuration is planar, and the direction on the photodetector configuration corresponding to the circumferential direction extends along at least one of an arc or a circle on the photodetector configuration.

17. The super resolution bore imaging system of claim 15, wherein the photodetector configuration comprises a cylindrical shape and the direction on the photodetector configuration corresponding to the circumferential direction extends along the circumference of the cylindrical shape.

18. The super resolution bore imaging system of claim 1, wherein at least one of A or C is at least 8 micrometers.

19. The super resolution bore imaging system of claim 1, wherein M is at most 0.1.

20. The super resolution bore imaging system of claim 1, wherein the known pixel geometry comprises pixels which have a shape that is not a quadrilateral, and which are arranged to fit together in a tiled pixel pattern.

* * * * *